United States Patent Office 2,911,589
Patented Nov. 3, 1959

2,911,589

MEASURING SYSTEM FOR MEASURING MAGNETIC FLUX AS A FUNCTION OF EXCITING CURRENT

William A. Carter, Chester, Pa., assignor to I-T-E Circuit Breaker Company, Philadelphia, Pa., a corporation of Pennsylvania Application December 5, 1955, Serial No. 550,993

10 Claims. (Cl. 324—43)

My invention relates to a means for measuring a transient magnetic field as a function of the exciting current causing this magnetic field and more specifically to the above stated system as applied to circuit breaker blowout structures.

As shown in copending application, Serial No. 545,956, filed November 9, 1955, now Patent No. 2,831,946, it is essential to determine the various magnetic characteristics for circuit breaker blowout structures such as field strength, field distribution, saturation effects, and phase shift as a function of the exciting current.

As has been set forth in the publication "Flux Measurements In Magnetic Air Circuit Breaker Interrupters" by W. A. Carter, American Institute of Electrical Engineers, April 20, 1955, in the extinguishing of an arc created by the separating contacts of a circuit breaker, the arc is moved into an arc extinguishing chamber through the action of two magnetic fields. The first field is that surrounding the arc current filament and the second is the field which is excited by the blowout structure.

Clearly, the speed with which the arc is drawn into the arc extinguishing chamber is determined by the field strength, hence high field strength is of great importance. Similarly, it is essential that the magnetic field of the blowout structure be substantially equally distributed along the length of the blowout structure in order that equal force may be imparted along the complete length of the arc. If this were not the case, then only relatively few plates within the arcing chamber would be subjected to the arc and would probably be damaged.

It is also important to know at which value saturation effects set in for a particular blowout structure, since the force per unit length of arc is reduced approximately to a direct proportionality with the arc current once saturation has been reached.

With regard to the problem of phase shift, it is to be understood that if an appreciable phase shift exists between the magnetic field of the blowout structure and the exciting current, which is the current of the arc, that it would be possible to have a phase relationship wherein the arc would be blown out of the arc extinguishing chamber and restrike of the arc would be possible.

In the past, determinations of these parameters have been made by utilizing well known methods of calibrated search coils or in the utilization of the Gauss effect in the element bismuth.

The use of search coil is obviously undesirable in the inherent difficulties of finding the functional relationship between the exciting current and the magnetic field being measured. A second shortcoming of the search coil method is that the measured value entails considerable mathematical manipulation in order to ascertain proper calibrations and to interpret data. That is to say, the results obtained from the search coil would have to be integrated and the magnetic field then calculated.

The Gauss effect depends on the proportional change in resistance of a unit length of bismuth when this length is placed in a varying magnetic field. However, the element bismuth has a high temperature coefficient of resistance and when using the Gauss effect in the above type measurement, it is required that special provisions be incorporated to account for the ambient temperature as well as for temperature changes during operation which may be appreciable.

The principle of my invention is to measure a transient field as a function of its exciting current by utilizing the Hall effect exhibited by bismuth carrying an electric current when placed in a magnetic field, the voltage appearing across the strip of bismuth being recorded simultaneously with the exciting current creating the magnetic field.

As is well known, if a sheet of bismuth is placed in a magnetic field and current is passed therethrough, equipotential points on opposite sides of the sheet are developed when the magnetic field is applied perpendicular to the sheet of bismuth. This potential difference is, with the exception of low density values, proportional to the magnitude of the instantaneous magnetic field. If, therefore, this voltage is impressed on a device such as an oscillograph, it is clear that the instantaneous values recorded will be directly proportional to the instantaneous magnetic field and no further calculation will be necessary.

Therefore, in using my novel system one may place a bismuth strip carrying an electrical current in a predetermined special relationship with respect to the magnetic field and a simultaneous recording may then be had of both the transient exciting current which in the case of circuit breaker blowout structures would be the current of the blowout coil and the instantaneous magnetic field at that particular point in the blowout structure. By then repeating this measurement at selected points within the blowout structure a complete map of the blowout magnetic field may be had. It will indicate field strength, field distribution, saturation effects and phase shift between the exciting current and the magnetic field at any point in the blowout structure.

Since the Hall effect is sensitive to the direction of the magnetic field, it is clear that the direction of the field may be ascertained merely by finding the probe position giving the highest signal.

Accordingly, a primary object of my invention is to provide a system for simultaneously measuring magnetic fields as a function of their exciting current.

Another object of my invention is to simultaneously and directly measure the magnetic field excited by a transient current.

Another object of my invention is to measure a magnetic field as a function of its exciting current by utilizing the Hall effect.

Another object of my invention is to utilize an oscillograph for simultaneously recording exciting current and the potential difference due to the Hall effect across a strip of bismuth carrying an electrical current, whereby, field strength, field distribution, saturation effects and phase shift of the magnetic field caused by the exciting current may be readily ascertained.

These and other objects of my invention will become apparent when taken in conjunction with the drawings, in which:

Figure 1a shows one type of well known probe and fluxmeter system that could be used in the system of Figure 1.

Figure 1:
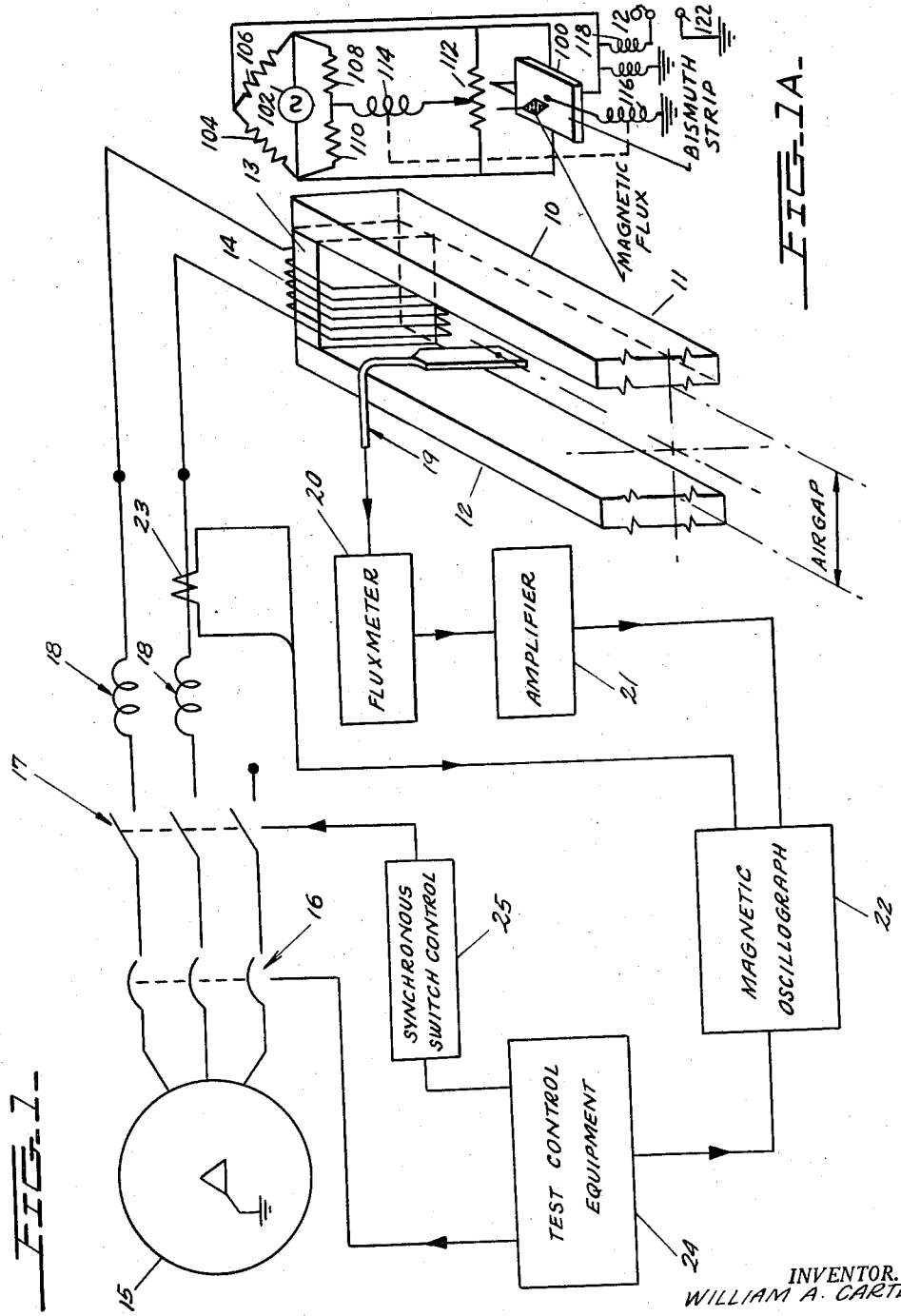
Figure 1 is a diagram of the novel measuring system of my invention.

Referring now to Figure 1, it is seen that my invention is applied to the measurement of a magnetic field within an experimental blowout structure shown generally at 10. More specifically, this blowout structure, which can be used to create a magnetic field which will interact with the magnetic field of an arc current, is composed of a first and second magnetic pole pieces 11 and 12. Bridging magnetic pole piece 13 is then positioned between the pole pieces 11 and 12 to provide a predetermined air gap therebetween, as well as providing a means for receiving a coil 14 which could be the blowout coil of a circuit breaker. The coil 14 is then shown as being energized from an A.-C. generator 15 which is connected in series with a back-up breaker 16, a synchronous switch 17 and an external circuit reactance 18, which could represent the total reactance of the circuit or if desired, could be utilized as a current limiting means.

The bismuth probe 19 which is so constructed as to be insertable within the air gap or within any area containing a magnetic field is then placed as shown in Figure 1, to have its plane perpendicular to the flux that will be passed between the pole pieces 11 and 12. As is schematically shown, a flux meter 20 is then provided to pass a relatively high frequency current through the probe 19, the ampltiude of this current being modulated by the voltage which would appear between the face of the bismuth strip. The modulated output of the flux meter 20 is then impressed on an amplifier 21, amplified therein and the signal is subsequently imposed upon the magnetic oscillograph 22.

Clearly, therefore, the system including the bismuth probe 19, flux meter 20 and amplifier 21 will impress a signal across the magnetic oscillograph 22, which is a function of the magnetic field between the pole pieces 11 and 12, this field being caused by the current in the coil 14.

Any well known commercially available probe, fluxmeter and amplifier system can be used for the system of Figure 1. Figure 1a, shows one type of system for illustrative purposes. The probe is formed of a bismuth wafer 100 which is positionable in a magnetic field as indicated by the arrow. The fluxmeter 20 of Figure 1 can be composed, as shown in Figure 1a, of a 2,000 cycle oscillator 102 as a voltage source for the A.-C. bridge composed of resistors 104—112. The junction of resistors 108 and 110 is connected to coil 114 and then to an adjustable point on resistor 112. Coil 114 is mutually coupled to coil 116 in the probe output circuit, and the probe output circuit, which is connected to opposite surfaces of the probe is connected to output transformer 118. The output of output transformer 118 is then connected to terminals 120 and 122 which represent the input terminals of any desired type amplifier schematically indicated as amplifier 21 in Figure 1. The operation of the combination shown in Figure 1 is well known in the art, it being sufficient to understand for the purposes of the instant invention, that the output voltage at terminals 120 and 122 is functionally related to the magnetic flux traversing the bismuth wafer 100.

The current transformer 23 is then placed in series with the coil 14 and the signal generated thereacross is similarly impressed upon the magnetic oscillograph 22. Although I show this current sensing element as the current transformer 23, it is to be understood that any desired type of current sensing device could have been used, such as an accurately calibrated shunt.

Hence, the magnetic field appearing between the poles 11 and 12 will be simultaneously plotted with the exciting current through coil 14 on the magnetic oscillograph 22.

The box 24 indicates test control equipment which functions to determine the time and sequence of events necessary to complete a given test. A synchronous switch control 25 which is of any desired well known commercially available type is provided for controlling the operation of synchronous switch 17, as well as portions of the test control equipment 24 which activate the magnetic oscillograph 22.

More specifically, the synchronous switch control unit 25 will contain automatic mechanisms which will always cause operation of the synchronous switch 17 at a predetermined point of the output alternating voltage of the A.-C. generator 15.

Furthermore, it will initiate operation of the magnetic oscillograph 22 at a sufficient time before the closing of synchronous switch 17, so that the photographic paper of the magnetic oscillograph 22 will reach its normal recording speed when the recording is to take place.

If a recording sequence has been completed, and since the current exciting the blowout coil 14 is of short circuit magnitude, the test control equipment 24 will further include means for initiating operation of the back-up breaker 16. By way of example, the back-up breaker 16 will be energized to open after 3 to 5 cycles of operation. Clearly, the synchronous switch 17 will control the asymmetry of the exciting current in order that the magnetic structure 10 will be excited identically for a series of consecutive tests while gathering data describing the field distribution between the pole pieces 11 and 12.

That is to say, once the synchronous switch is closed, it remains closed and the circuit is thereafter opened by the back-up breaker 16 after a predetermined number of cycles when the test is complete. In the next test, the synchronous switch 17 will close at the same instantaneous voltage at which it had closed in the first test.

If now, it is desirable to completely map the magnetic field appearing within the air gap defined by the pole pieces 11 and 12, it is clear that a series of measurements can be taken with the bismuth probe 19 in various positions along the air gap. It is to be noted that the voltage appearing across the bismuth probe and subsequently amplified and impressed on the magnetic oscillograph 22 will be a direct function of the magnetic field, and further mathematical manipulation is not necessary in order to obtain the value of this magnetic field.

Figure 2:
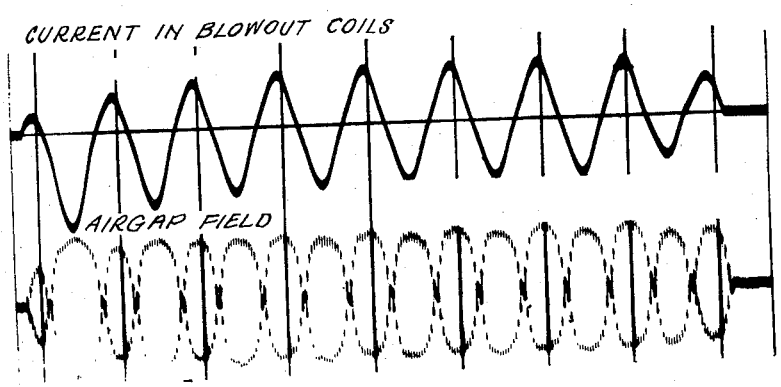
Figure 2 is a typical oscillogram of the system shown in Figure 1, in conjunction with a specific magnetic structure.
Figure 3:
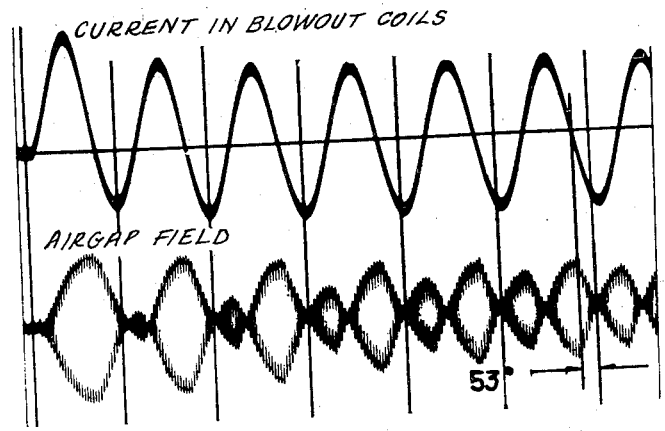
Figure 3 is a similar to Figure 2, and is a reproduction of a simultaneously measured magnetic field and exciting current, and specifically illustrates a phase shift between the current and the field.

The type of data obtainable from my novel measuring system may be seen with reference to Figures 2 and 3. In both of these figures, it is seen that the field is given by the envelope of a modulated high frequency signal. That is to say, the voltage appearing across the bismuth probe 19 will modulate a relatively high frequency signal see Figure 1a, this modulated signal then being amplified and impressed on the magnetic oscillograph. Therefore, the value of the instantaneous magnetic field is determined by the envelope of this modulated signal as seen in each of Figures 2 and 3.

The vertical lines in Figures 2 and 3 are lines of construction and allow the blowout coil current to be compared to the field in the air gap at particular times.

In the case of Figure 2, it is seen that the current in the blowout coils is substantially in phase with the magnetic field in the air gap. The reasons for this in phase relationship may be seen with reference to the above mentioned copending application, Serial No. 545,946, filed November 9, 1955, which describes the effect of phase shift as a function of the laminating of the magnetic core. The particular core measured in Figure 2 was interleaved and horizontally laminated and as is shown in the figure, phase shift is negligible.

In the case of Figure 3, a vertically laminated core was constructed and butt joints were used to magnetically connect the various vertically laminated pole pieces whereby an appreciable phase shift of 53° was measured at the particular instant indicated.

As was previously mentioned, a series of curves, such as the curves of Figures 2 and 3, may be taken where the bismuth probe in each is placed in a different position within the air gap being studied. In this manner, a complete map of the magnetic flux may be obtained as is shown in Figure 5.

Figures 4A, 4B, 4C, 4D, 5:
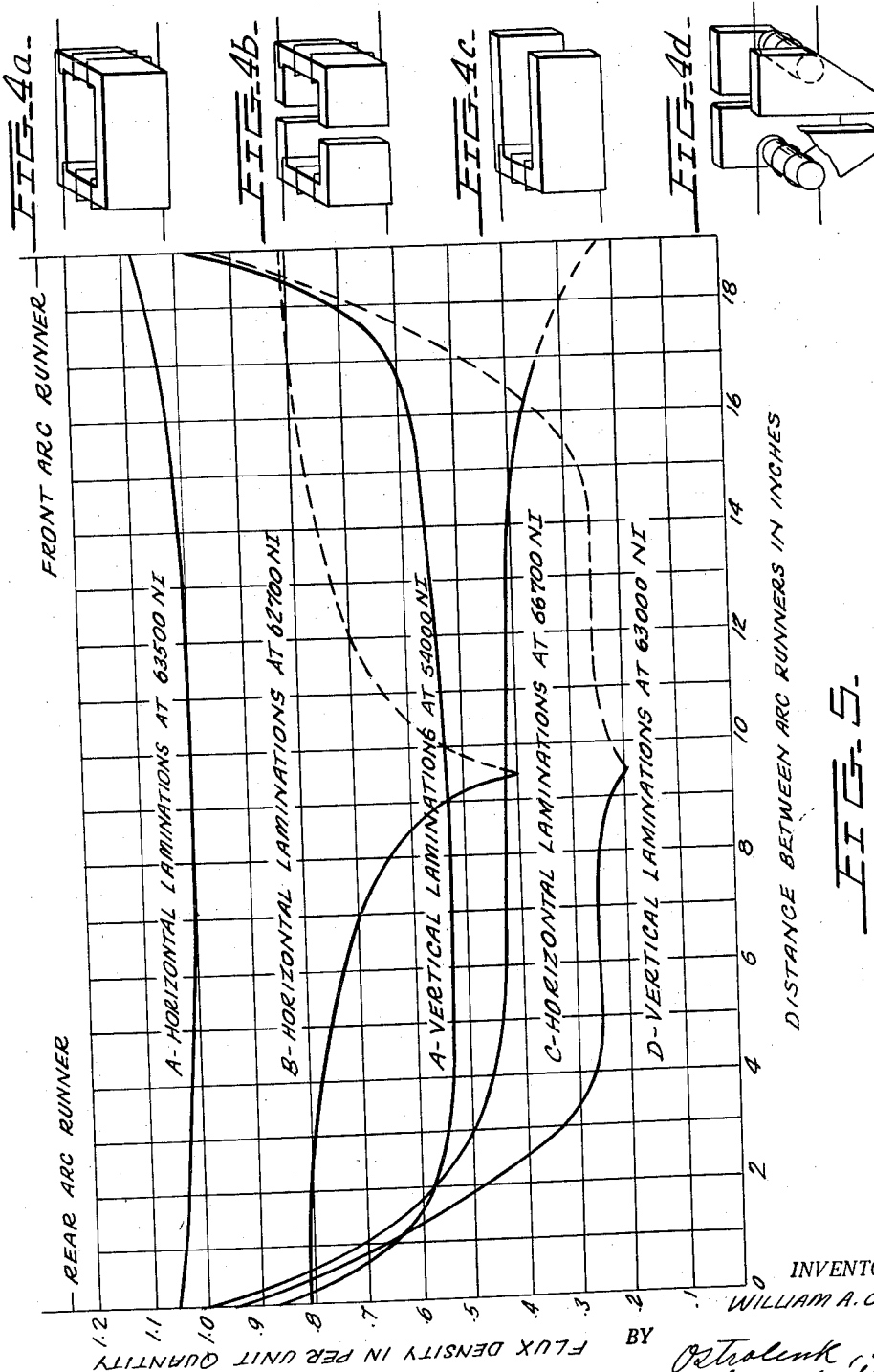
Figures 4a through 4d illustrate magnetic structures in which the magnetic field has been measured as a function of exciting current.
Figure 5 illustrates the relationship of of the flux density as a function of distance between arc runners (or distance along the magnetic field), in each of the magnetic structures of Figures 4a through 4d with ampere-turns as a parameter.

More specifically, Figure 5 shows the magnetic field distribution as a function of a transient exciting current for each of the magnetic structures shown in Figures 4a through 4d as measured by my novel measuring system. It is to be noted that the fields of Figure 5 have been plotted as per unit quantities in order to allow direct comparisons between each of the structures of Figures 4a through 4d. It is to be further noted that the dashed portions of each of curves 4b and 4d represent projected field symmetry. Furthermore, each of the curves of Figure 5 marked a, b, c and d are correlated with the magnetic structures 4a, 4b, 4c and 4d respectively.

It is clear from the curves that the structure shown in Figure 4a will be the most effective of the group of structures seen in Figures 4a through 4d, since it presents a very high level of field strength which is substantially equally distributed along the full length of the air gap. The curve similarly shows the desirability of using a core structure which is horizontally laminated, since the use of vertical laminations, as seen in the lower curve a, appreciably decreases the field strength along the center portions of the air gap. Hence, my novel system can readily evaluate a core structure as to total field strength, field distribution, field saturation which is determined by the predetermined off-set given to the current wave as seen in each of Figures 1 and 2, and as was seen in conjunction with Figures 2 and 3, the phase shift between the exciting current and the magnetic field. Furthermore, this evaluation is afforded by taking measurements at a relatively few number of points at a constant calibration to thereby minimize both test time and errors in the measurements.

While my novel system has been illustrated here in conjunction with the blowout structure of the circuit breaker, it is to be understood that my novel system may be used to measure any magnetic field as a function of current which excites the magnetic field. Similarly, my novel system could have been shown in conjunction with measurement of a field which has any undetermined curvature, rather than the substantially straight magnetic fields which would appear across the pole pieces of 11 and 12 of the structure of Figure 1.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. A system for simultaneously measuring a magnetic field and the current causing said magnetic field; said system comprising a probe for measuring magnetic fields, a current sensing means and a recording means; said current sensing means being connected to have an output which is a function of the instantaneous value of said current causing said magnetic field; said probe being constructed to have an output due to Hall effect potential appearing thereacross when said probe is positioned in said magnetic field; the outputs of said probe and said current sensing means being connected to said recording means whereby the instantaneous strength of said magnetic field at the point at which said probe is positioned is simultaneously recorded with the corresponding instantaneous current.

2. A system for simultaneously measuring a magnetic field and the current causing said magnetic field; said system comprising a probe for measuring magnetic fields, a current sensing means and a recording means; said current sensing means being connected to have an output which is a function of the instantaneous value of said current causing said magnetic field; said probe being constructed to have an output due to Hall effect potential appearing thereacross when said probe is positioned in said magnetic field; the outputs of said probe and said current sensing means being connected to said recording means whereby the instantaneous strength of said magnectic field at the point at which said probe is positioned is simultaneously recorded with the corresponding instananeous current; said simultaneous recording indicating phase shift between said magnetic field and said current causing said magnetic field.

3. A system for simultaneously measuring a magnetic field and the current causing said magnetic field; said system comprising a probe for measuring magnetic fields, a current sensing means and a recording means; said current sensing means being connected to have an output which is a function of the instantaneous value of said current causing said magnetic field; said probe being constructed to have an output due to Hall effect potential appearing thereacross when said probe is positioned in said magnetic field; the outputs of said probe and said current sensing means being connected to said recording means whereby the instantaneous strength of said magnetic field at the point at which said probe is positioned is simultaneously recorded with the corresponding instantaneous current; a series of said simultaneous recordings being effective to indicate field strength, saturation effects distribution and direction of said magnetic field.

4. A system for simultaneously measuring a magnetic field and the current causing said magnetic field; said system comprising a bismuth probe for measuring magnetic fields, a current sensing means and an oscillograph; said current sensing means being connected to have an output which is a function of the instantaneous value of said current causing said magnetic field; said bismuth probe being constructed to have an output due to Hall effect potential appearing thereacross when said bismuth probe is positioned in said magnetic field; the outputs of said bismuth probe and said current sensing means being connected to said oscillograph whereby the instantaneous strength of said magnetic field at the point at which said bismuth probe is positioned is simultaneously recorded with the corresponding instantaneous current.

5. A system for simultaneously measuring a magnetic field and the current causing said magnetic field; said system comprising a bismuth probe for measuring magnetic fields, a current sensing means and an oscillograph; said current sensing means being connected to have an output which is a function of the instantaneous value of said current causing said magnetic field; said bismuth probe being constructed to have an output due to Hall effect potential appearing thereacross when said bismuth probe is positioned in said magnetic field; the outputs of said bismuth probe and said current sensing means being connected to said oscillograph whereby the instantaneous strength of said magnetic field at the point at which said bismuth probe is positioned is simultaneously recorded with the corresponding instantaneous current; said simultaneous recording indicating phase shift between said magnetic field and said current causing said magnetic field; a series of said simultaneous recordings being effective to indicate field strength, saturation effects, distribution and direction of said magnetic field.

6. A system for simultaneously measuring a transient magnetic field and the current causing said magnetic field; said system comprising a bismuth probe for measuring said magnetic field, a current sensing device, an oscillograph, a flux meter and an amplifier; said current sensing device being connected to carry said current causing said magnetic field; said bismuth probe being positioned in said magnetic field and connected to said flux meter to modulate a relatively high frequency signal of said flux meter by Hall effect voltage appearing across said bismuth probe; said modulated signal of said flux meter being impressed upon the input of said amplifier; the amplified output of said modulated signal and the output of said current sensing device being simultaneously impressed upon said oscillograph whereby a curve of magnetic field and a curve of current exciting said magnetic field are simultaneously recorded.

7. A system for simultaneously measuring a transient magnetic field and the current causing said magnetic field; said system comprising a bismuth probe for measuring said magnetic field, a current sensing device, an oscillograph, a flux meter and an amplifier; said current sensing device being connected to carry said current causing said magnetic field; said bismuth probe being positioned in said magnetic field and connected to said flux meter to modulate a relatively high frequency signal of said flux meter by Hall effect voltage appearing across said bismuth probe; said modulated signal of said flux meter being impressed upon the input of said amplifier; the amplified output of said modulated signal and the output of said current sensing device being simultaneously impressed upon said oscillograph whereby a curve of magnetic field and a curve of current exciting said magnetic field are simultaneously recorded; said simultaneous recording indicating phase shift between said magnetic field and said current causing said magnetic field; a series of said simultaneous recordings being effective to indicate field strength, saturation effects, distribution and direction of said magnetic field.

8. A system for simultaneously measuring the magnetic field of a circuit breaker blowout structure and the current in a blowout coil causing said magnetic field; said system including a probe for measuring magnetic fields, a current sensing means and a recording means; said current sensing means being connected in series with said blowout coil, said probe being constructed to have an output due to Hall effect potential appearing thereacross when said probe is positioned in said magnetic field of said blowout structure; the outputs of said probe and said current sensing means being connected to said recording means whereby the instantaneous current and the instantaneous field strength are continuously and simultaneously recorded on said recording means.

9. A system for simultaneously measuring the magnetic field of a circuit breaker blowout structure and the current in a blowout coil causing said magnetic field; said system comprising a bismuth probe for measuring said magnetic field, a current sensing device, an oscillograph, a flux meter and an amplifier; said current sensing device being connected to carry said current causing said magnetic field; said bismuth probe being positioned in said magnetic field and connected to said flux meter to modulate a relatively high frequency signal of said flux meter by Hall effect voltage appearing across said bismuth probe; said modulated signal of said flux meter being impressed upon the input of said amplifier; the amplified output of said modulated signal and the output of said current sensing device being simultaneously impressed upon said oscillograph whereby a curve of magnetic field and a curve of current exciting said magnetic field are simultaneously recorded.

10. A system for simultaneously measuring the magnetic field of a circuit breaker blowout structure and the current in a blowout coil causing said magnetic field; said system comprising a bismuth probe for measuring said magnetic field, a current transformer, an oscillograph, a flux meter and an amplifier; said current transformer being connected to carry said current causing said magnetic field; said bismuth probe being positioned in said magnetic field and connected to said flux meter to modulate a relatively high frequency signal of said flux meter by Hall effect voltage appearing across said bismuth probe; said modulated signal of said flux meter being impressed upon the input of said amplifier; the amplified output of said modulated signal and the output of said current transformer being simultaneously impressed upon said oscillograph whereby a curve of magnetic field and a curve of current exciting said magnetic field are simultaneously recorded; said simultaneous recording indicating phase shift between said magnetic field and said current causing said magnetic field; a series of said simultaneous recordings being effective to indicate field strength, saturation effects, distribution and direction of said magnetic field.

References Cited in the file of this patent

UNITED STATES PATENTS

| | | |
|---|---|---|
| 1,778,796 | Craig | Oct. 21, 1930 |
| 2,506,433 | Plesset | May 2, 1950 |
| 2,531,807 | Pangher | Nov. 28, 1950 |
| 2,707,769 | Shaper | May 3, 1955 |
| 2,743,416 | Kelly | Apr. 24, 1956 |